US011343867B2

(12) United States Patent
Kochiev et al.

(10) Patent No.: US 11,343,867 B2
(45) Date of Patent: May 24, 2022

(54) SELECTIVE DUAL CONNECTIVITY BASED ON DEVICE VELOCITY

(71) Applicant: T-Mobile USA, Inc., Bellevue, WA (US)

(72) Inventors: Timur Kochiev, Snoqualmie, WA (US); Alan Denis MacDonald, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/019,118

(22) Filed: Sep. 11, 2020

(65) Prior Publication Data

US 2022/0086932 A1     Mar. 17, 2022

(51) Int. Cl.
*H04W 76/15*     (2018.01)
*H04B 7/01*     (2006.01)
*H04W 4/02*     (2018.01)

(52) U.S. Cl.
CPC .............. *H04W 76/15* (2018.02); *H04B 7/01* (2013.01); *H04W 4/027* (2013.01)

(58) Field of Classification Search
None
See application file for complete search history.

(56) References Cited

U.S. PATENT DOCUMENTS

2021/0084559 A1\*   3/2021   Chaponniere ......... H04W 36/08
2021/0286045 A1\*   9/2021   Bayesteh ............... G01S 7/006

\* cited by examiner

*Primary Examiner* — Diane L Lo
(74) *Attorney, Agent, or Firm* — Lee & Hayes, P.C.

(57) ABSTRACT

Systems, methods, and devices can be utilized to selectively connect to a device via extremely high frequency (EHF) radio resources based on the velocity of the device. An example method includes receiving, from a user equipment (UE), a first wireless signal with a first frequency that is less than 30 Gigahertz (GHz). The example method further includes determining a velocity of the UE based on the first wireless signal and determining that the velocity of the UE is less than a threshold velocity. Based on determining that the velocity of the UE is less than the threshold velocity, a second wireless signal is transmitted to the UE with a second frequency that is greater than or equal to 30 GHz.

19 Claims, 6 Drawing Sheets

SELECTIVE DUAL CONNECTIVITY BASED ON DEVICE VELOCITY

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures.

FIGS. 2A and 2B illustrate examples of transmissions that can be used to selectively establish connections over extremely high frequency (EHF) radio resources based on device velocity.

DETAILED DESCRIPTION

The systems, devices, and techniques described herein relate to establishing a split radio bearer with a User Equipment (UE) when the UE is traveling at a velocity that is less than a threshold velocity, and establishing a single radio bearer with the UE when the UE is traveling at a velocity that is greater than or equal to a threshold velocity. In some examples described herein, a high frequency radio resource is used to exchange data with the UE when the velocity of the UE is less than the threshold velocity, whereas the high frequency radio resource may not be used to exchange data with the UE when the velocity of the UE is greater than or equal to the threshold velocity.

5G has introduced radio access technologies that can utilize extremely high frequency (EHF) radio signals to wirelessly exchange data between radio access networks (RANs) and UEs. These EHG radio signals can have frequencies in a range of 30 to 300 gigahertz (GHz). EHF radio signals include wavelengths ranging from one to ten millimeters. Accordingly, EHF radio signals can be referred to as millimeter wave (mmWave) signals.

By utilizing EHF radio spectrum, 5G networks can significantly increase bandwidth, thereby significantly increasing wireless data throughput over wireless links. However, utilizing EHF radio spectrum to reliably transmit radio signals, particularly in the telecommunications context, can be challenging. Because radio attenuation increases with frequency, EHF radio signals are more likely to be attenuated by physical impediments than lower-frequency radio signals, such as signals transmitted over traditional LTE radio bands (e.g., radio signals transmitted at frequencies that are less than 30 GHz).

To prevent interruptions as services are transmitted wirelessly over EHF radio spectrum, some RANs selectively connect to UEs over EHF radio resources when the UEs and the RANs are able to exchange wireless signals with limited degradation over the course of transmission. For instance, a RAN and a UE may exchange radio resource control (RRC) messages that indicate whether the distance between the RAN is sufficiently short and/or clear of obstructions to support reliable transmissions over EHF radio resources. These RRC messages may include B1 measurement reports. In various cases, a RAN may establish a connection with the UE over EHF resources based on the RRC messages.

However, because many UEs are mobile, the path between the UEs and the RANs can change after RRC messages are exchanged. For example, a UE may initially be located at a first location that is relatively close to a RAN with clear line-of-sight during RRC message exchange, but may be moving at a high speed away from the RAN, such that the UE may be located at a second location that is relatively far away from the RAN when the RAN attempts to transmit a wireless signal to the UE over EHF resources. In various cases, a UE moving at a high speed is more likely to lose a clear line-of-sight with a RAN than a UE moving at a low speed, due to the increased chance of obstructions (e.g., trees, buildings, and other sources of physical attenuation) arising between the RAN and the UE moving at the high speed. Thus, relying on RRC messages alone can cause a RAN to connect a UE via EHF resources, even when EHF resources are unsuitable for reliable transmissions between the RAN and the UE.

In various implementations of the present disclosure, a RAN may selectively connect to the UE over an EHF radio resource when the UE is traveling less than a threshold velocity. When the UE is traveling less than the threshold velocity, then the UE is relatively unlikely to lose clear line-of-sight with the RAN. Accordingly, the RAN and the UE can exchange EHF radio signals with a relatively low risk of interruptions to the services carried by those radio signals. In contrast, when the UE is traveling at a velocity that is greater than or equal to the threshold velocity, then then UE is relatively likely to lose clear line-of-sight with the RAN. Thus, the RAN may refrain from connecting to the UE over the EHF radio resource when the velocity of the UE is greater than or equal to the threshold velocity. Instead, the RAN may connect to the UE over a relatively lower-frequency radio resource, which may be less attenuated by impediments in the surrounding environment.

In some examples, upon determining that the UE is traveling at less than the threshold, the RAN may exchange data with the UE over a split radio bearer. That is, the RAN and the UE may exchange data in a dual connectivity mode. The split radio bearer may include a first radio bearer utilizing an EHF radio resource as well as a second radio bearer utilizing a sub-EHF radio resource. The RAN may transmit and/or receive data wirelessly from the UE over the first radio bearer and the second radio bearer of the split radio bearer. In contrast, if the RAN determines that the UE is travelling at a velocity that is greater than the threshold velocity, the RAN may exchange data with the UE over a single radio bearer, which utilizes a sub-EHF radio resource. Accordingly, various implementations described herein can be implemented in a variety of standalone (SA) and non-standalone (NSA) environments.

Various implementations described herein improve telecommunication networks by increasing bandwidth and decreasing service outages or other interruptions. Selectively connecting to a UE via an EHF radio resource when the UE is travelling relatively slowly can increase bandwidth over which to exchange data wirelessly with the UE. However, by refraining from connecting to the UE via the EHF radio resource when the UE is traveling relatively fast can prevent interruptions in the connection with the UE caused by attenuation.

Furthermore, various implementations described herein improve UE performance. A UE that connects to a dual radio bearer may expend battery resources at a higher rate than a UE that connects to a single radio bearer. In examples in which the UE is selectively connected to a dual bearer utilizing an EHF radio resource when the velocity of the UE is relatively low, the UE may expend battery resources at the higher rate when transmissions over the EHF radio resource is likely to be uninterrupted. When the UE is traveling at a relatively high velocity and transmissions between the UE over the EHF radio resource are likely to be interrupted, the UE may conserve battery resources. When the UE is a wireless mobile device, conserving battery resources can significantly impact the performance of the UE.

Various examples of the present disclosure will now be described with reference to the accompanying figures.

Figure 1:
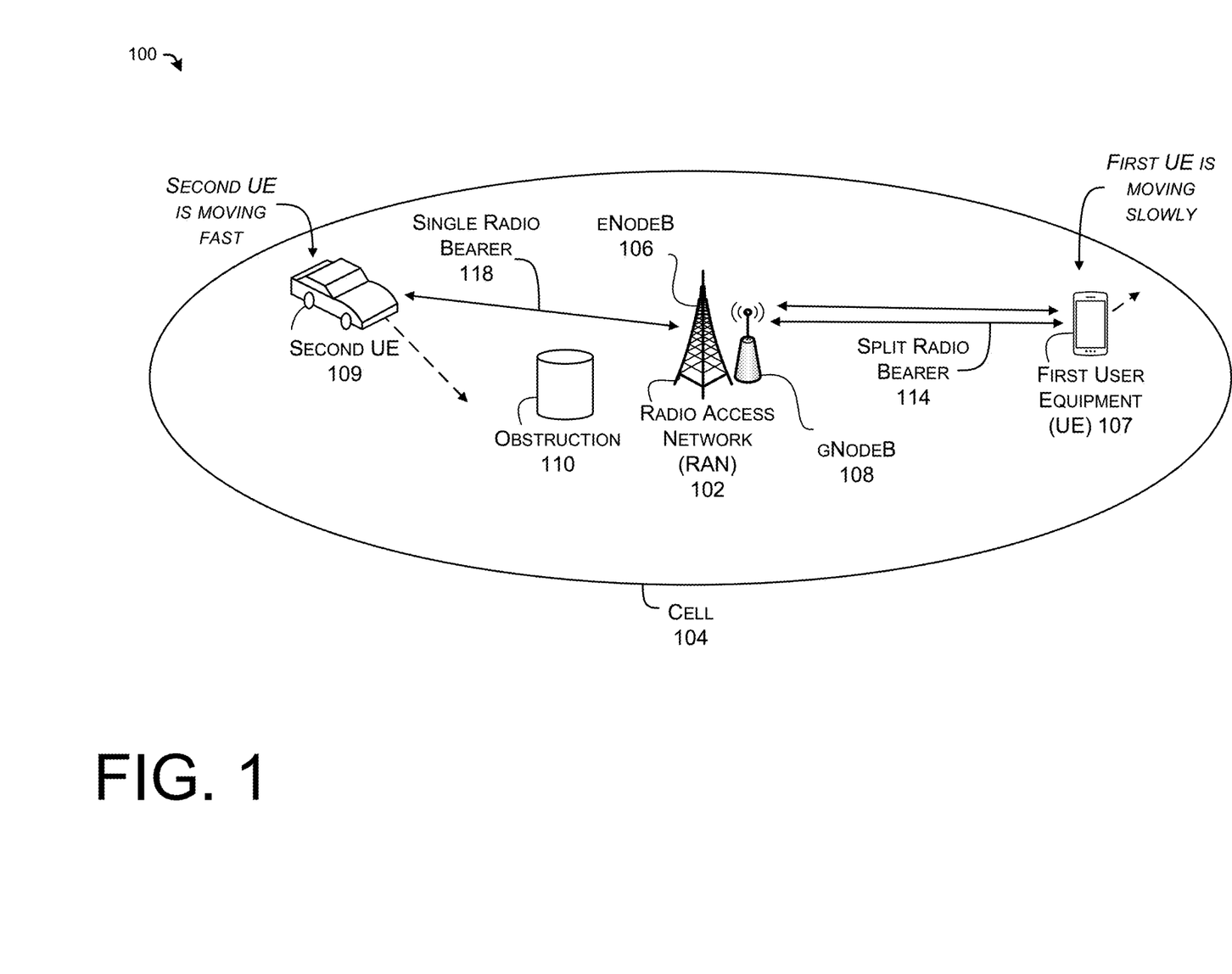
FIG. 1 illustrates an example network environment for selective dual connectivity based on device velocity.

FIG. 1 illustrates an example network environment 100 for selective dual connectivity based on device velocity. In the network environment 100, a radio access network (RAN) 102 can communicate with any of a variety of devices in a cell 104, such as a first user equipment (UE) 106 and a second UE 109.

In various embodiments, the RAN 102 may include device(s) configured to schedule wireless resources for uplink and downlink communications within the cell 104. The RAN 102 may further include device(s) configured to transmit communications over the wireless resources to devices located in the cell 104 (e.g., the first UE 107, the second UE 109, and the like), and receive communications over the wireless resources from the devices located in the cell 104.

Although not illustrated in FIG. 1, in some instances, the RAN 102 may relay communications between an external network (e.g., a core network) and the devices located in the cell 104. A core network, for example, can provide services to device(s) via the RAN 102 from a wide area network (WAN), such as the Internet. In some cases, the core network includes an evolved packet core (EPC), a 5G core (5GC), or the like.

In some instances, the core network includes an IP Multimedia Subsystem (IMS) core (sometimes referred to as an "IMS core network," an "IMS network," a "Core Network (CN)," or an "IM CN Subsystem"). IMS is an architectural framework defined by 3GPP for delivering Internet Protocol (IP) multimedia to a device, such as a UE. The IMS core can be maintained and/or operated by one or more service providers, such as one or more wireless carriers ("carriers"), that provide IMS-based services to a user who is associated with the device. For example, a service provider can offer multimedia telephony services that allow a user to call or message other users via the IMS core using his/her device. A user can also utilize an associated device to receive, provide, or otherwise interact with various different IMS-based services by accessing the IMS core. It is to be appreciated that any number of base stations, such as the RAN 102, and/or IMS nodes can be associated with the IMS network.

An operator of the IMS core can offer any type of IMS-based service, such as, telephony services, emergency services (e.g., Enhanced 911 (E911)), gaming services, instant messaging services, presence services, video conferencing services, social networking and sharing services, location-based services, push-to-talk services, and so on. In order to access these services (e.g., telephony services), a device (e.g., the first UE 107 or the second UE 109) is configured to request establishment of a communication session. In the case of telephony services, the communication session can comprise a call (e.g., a voice-based communication session, such as a Voice Over LTE (VoLTE) call, or a Wi-Fi call).

According to various implementations, the RAN 102 includes an evolved node B (eNodeB) 106 and a gNodeB 108. The eNodeB 106 transmits data wirelessly to devices (e.g., the first UE 104, the second UE 106, and the like) within the cell 104 over one or more first wireless bands. The first wireless band(s) include, for instance, frequency resources in at least one of a Citizens Broadband Radio Service (CBRS) band (e.g., a 3550-3700 megahertz (MHz) band), LTE Band 71 (e.g., a 600 MHz band), an LTE Band 48 (e.g., 3500 MHz), and the like. In some instances, the frequency resources can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE Band 50 (1500 MHz), LTE Band 51 (1500 MHz), LTE Band 66 (1700 MHz), LTE Band 70 (2000 MHz), and LTE Band 74 (1500 MHz). In various examples, the eNodeB 106 transmits and/or receives data wirelessly over one or more sub-EHF wireless bands, which may include frequencies of less than 30 GHz.

In various instances, the gNodeB 108 can utilize wireless resources specified in the 5G New Radio (NR) standard, as defined by 3GPP. The gNodeB 108 can transmit and receive data wirelessly with devices (e.g., the first UE 107, the second UE 109, and the like) in the cell 104 over frequency resources including EHF and mmWave bands including, but not limited to a 26 GHz Band, a 28 GHz Band, a 39 GHz Band, a 60 GHz Band, and the like. As used herein, the term "EHF" can refer to frequencies greater than or equal to 26 GHz or the like. In some cases, the term "EHF" can refer to frequencies less than or equal to 300 GHz. The term "sub-EHF," and its equivalents, can refer to frequencies less than 26 GHz. In some cases, the term "sub-EHF" can refer to frequencies greater than or equal to 400 MHz. In some cases, the gNodeB 108 may communicate with devices located in a mid-cell region of the cell 104. For instance, the transmissions received and/or transmitted by the gNodeB 108 may be subjected to a higher degree of attenuation from atmospheric and environmental obstructions within the cell 104, which may prevent those transmissions from reliably traveling the full radius of the cell 104.

In some embodiments, the RAN 102 is part of an NSA architecture or an SA architecture. In an example NSA architecture, the gNodeB 108 may be connected to the eNodeB 106, and the eNodeB 106 may relay data between an external core network (e.g., an EPC) and the gNodeB 108. In an example SA architecture, the gNodeB 108 may be connected directly to a core network (e.g., a 5GC).

The cell 104 may be a geographic region in which the RAN 102 can transmit and/or receive wireless communications. The cell 104 may be divided into at least two regions, which are defined according to a distance from RAN 102, a quality of wireless communications with the RAN 102, sources of attenuation in the cell 104, etc. For example, the cell 104 may include a mid- or near-cell region and a cell edge region. In some instances, the mid-cell region is less than a threshold distance from the RAN 102 and is a region where wireless communication with the RAN 102 is relatively strong. In certain instances, the cell edge region is more than a threshold distance from the RAN 102 and has an outer boundary that is defined by an outer boundary of the cell 104. In some instances, the cell edge region is a region where wireless communication with the RAN 102 is weaker than in the mid-cell region. In some cases, the eNodeB 106 can communicate with devices in the mid-cell region and the cell edge region of the cell 104. In some examples, the gNodeB 108 can communicate with devices in the mid-cell region but may be unable to communicate with devices in the cell edge region.

Devices, including the first UE 107 and the second UE 109, may be configured to transmit and/or receive wireless communications with the RAN 102 may be located in the cell 104. Any of the devices may be capable of supporting NR communications. For example, the devices may be configured to support at least one of enhanced Mobile Broadband (eMBB) communications, Ultra Reliable Low Latency Communications (URLLCs), or massive Machine Type Communications (mMTCs). In some instances, the devices can include at least one device supporting one or more of a sensor network, voice services, smart city cameras, gigabytes-in-a-second communications, 3D video, 4K screens, work & play in the cloud, augmented reality, industrial and/or vehicular automation, mission critical broadband, or self-driving cars.

The devices may be any form of devices capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future IP-based network technology or evolution of an existing IP-based network technology. Examples of the devices (e.g., the first UE 107 and the second UE 109) can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of devices include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network. As illustrated in FIG. 1, the first UE 107 and the second 108 are examples of devices located in the cell 104.

The first UE 107 may be defined as a mobile device configured to transmit and receive communications with the RAN 102 over the wireless resources. As illustrated in FIG. 1, the first UE 107 is located in the cell 104, however, the first UE 107 may move outside of the cell 104 entirely. In some embodiments, the first UE 107 may move inside of the cell 104 while transmitting and receiving communications with the RAN 102. In various cases, the first UE 107 may be stationary and/or move at a relatively slow speed or velocity through the cell 104.

The speed or velocity of a device in the cell 104 can be identified, in some cases, based on a fading condition of signals transmitted and/or received by the device. In various implementations, the term "fading" can refer to a variation of a frequency, an amplitude, and/or phase of a wireless signal. A signal may fade with respect to time, geographical position, radio frequency, or a combination thereof. In some instances, a device experiences a fading condition when it transmits and/or receives a wireless signal exhibiting a Doppler shift. A device may experience a slow-fading condition when the device transmits or receives a signal with a relatively slowly changing amplitude and/or phase. In some instances, a signal exhibits a slow-fading condition when a coherence time (e.g., a time interval over which a phase of the signal is predictable, on average) of the signal is greater than a period of a symbol in the signal. A device that is moving relatively slowly through a cell, e.g., the cell 104, may experience slow fading. A device that is separated from a source of the wireless signal, e.g., the RAN 102, by an obstruction, e.g., obstruction 110, a hill, or a building, may experience slow fading. In some embodiments, a device is experiencing a slow-fading condition when the device transmits and/or receives a wireless signal exhibiting a Doppler shift that is greater than a first threshold, but less than a second threshold.

On the other hand, a device may experience a fast-fading condition when the device transmits or receives a signal with a relatively fast changing amplitude and/or phase. In some instances, a signal exhibits a fast-fading condition when a coherence time of the signal is less than a period of a symbol in the signal. A device that is moving relatively quickly through a cell region, e.g., cell 104, may experience a fast-fading condition. In some embodiments, a device is experiencing a fast-fading condition when the device transmits and/or receives a wireless signal exhibiting a Doppler shift that is greater than the first threshold and greater than the second threshold.

The second UE 109 may be a mobile device configured to transmit and receive communications with the RAN 102 over the wireless resources. In some cases, the second UE 109 may be integrated with and/or located inside of an automobile. As illustrated in FIG. 1, the second UE 109 may be located in the cell 104 and may be moving relatively quickly throughout the cell 104. For instance, the second UE 109 may move relatively quickly behind the obstruction 110 while communicating with the RAN 102. The second UE 109 may therefore experience a fast-fading condition.

As may be understood, the RAN 102 may be implemented in accordance with any one of Option 3, 3a, 3x, 4, 4a, 7, 7a, and/or 7x, as defined by 3GPP. That is, the environment 100 may be connected to a 5GC and/or may include additional data-plane or control-plane signaling. In general, the techniques discussed herein may be implemented in any dual connectivity or multi connectivity environment.

In various cases, the first UE 107 may connect to the RAN 102. For example, eNodeB 106 may broadcast a signal advertising the presence of the RAN 102 throughout the cell 104. In some cases, the broadcast signal is transmitted by the eNodeB 106 over sub-EHF radio resources. Upon receiving the broadcast signal, the first UE 107 may transmit a connection request to the RAN 102. In some cases, the connection request is transmitted to the eNodeB 106 over sub-EHF radio resources. In some cases, the connection request indicates that the first UE 107 is configured to receive and/or transmit data over EHF radio resources. The first UE 107 may attach to the RAN 102, such that a default radio bearer may be established between the first UE 107 and the RAN 102. At this stage, uplink and downlink data can be exchanged between the first UE 107 and the eNodeB 106.

The RAN 102 may determine whether to connect to the first UE 107 via the gNodeB 108, which may communicate with the first UE 107 over EHF radio resources. In some cases, the RAN 102 may cause the gNodeB 108 to transmit one or more messages over a EHF radio channel to the first UE 107. In some cases, the messages can include at least one RRC message. Based on the one or more messages as-received by the first UE 107, the first UE 107 may transmit a measurement report to the eNodeB 106. For example, the first UE 107 may transmit a B1 measurement report that indicates whether the first UE 107 reliably received the one or more messages from the gNodeB 108, and which may indicate whether the first UE 107 and the gNodeB 108 are able to reliably communicate via the EHF radio resources. In various examples, the measurement report transmitted by the first UE 107 may indicate, to the RAN 102, that the first UE 107 is located in a EHF coverage area of the RAN 102.

In addition, the RAN 102 may also determine whether to connect to the first UE 107 via the gNodeB 108 based on the velocity of the first UE 107. In some cases, the RAN 102 may identify the velocity of the first UE 107 based on a Doppler shift and/or a fading condition of the measurement report transmitted to the RAN 102 or some other signal transmitted between the first UE 107 and the RAN 102. Thus, in some cases, the RAN 102 may measure the velocity of the first UE 107 based on signaling between the RAN 102 and the first UE 107.

In some cases, the RAN 102 may send a velocity request to the first UE 107, which may cause the first UE 107 to measure and/or report the velocity of the first UE 107 and to transmit the velocity in a response to the RAN 102. In some cases, the first UE 107 may include a global positioning service (GPS) receiver that receives GPS signals from multiple GPS satellites. Each GPS signal may indicate a time at which it was transmitted from its respective satellite, a position of the respective satellite at transmission, and a synchronization code that the first UE 107 can use to synchronize the time scale of the first UE 107 and the time scale of the respective GPS satellite. The first UE 107 may determine a times-of-arrival of the GPS signals and calculate times-of-flight of the GPS signals based on the transmission times and the times-of-arrival of the GPS signals. Based on the times-of-flight, and the positions of the satellites transmitting the GPS signals, the first UE 107 may identify its position. In some cases, the first UE 107 may measure its positions at a first time and at a second time, and may calculate the velocity of the first UE 107 by dividing the distance between the position at the first time and the position at the second time with a difference between the first time and the second time. In some cases, the first UE 107 may include an accelerometer and/or motion sensor and may calculate the velocity of the first UE 107 based on measurements by the accelerometer and/or motion sensor. The first UE 107 may generate and transmit a response to the RAN 102 that indicates the velocity of the first UE 107.

In some cases, the velocity of the first UE 107 includes a speed of the first UE 107 in a particular direction. In various examples, the rate at which the first UE 107 is traveling towards the RAN 102 may actually decrease the chance that an obstruction will arise between the first UE 107 and the RAN 102. Thus, in some examples, the direction at which the speed is assessed may be a radial direction from the RAN 102 to the first UE 102, such that the speed indicates a rate at which the first UE 107 is traveling away from the RAN 102. In some cases, the direction may be tangential to the first UE 102, such that the speed indicates a rate at which the first UE 107 is traveling around the RAN 102.

In various examples, the RAN 102 may compare the velocity of the first UE 107 to a velocity threshold (e.g., 1 kilometer per hour, 10 kilometers per hour, 20 kilometers per hour, or the like). In some cases, the RAN 102 may determine that the velocity of the first UE 107 is less than velocity threshold. In response to determining that the velocity of the first UE 107 is less than the velocity threshold, the gNodeB 106 of the RAN 102 may connect to the first UE 107 over EHF radio resources. Thus, the gNodeB 106 and the first UE 107 may transmit data to one another over one or more EHF radio bearers. In some cases, the RAN 102 may establish a split radio bearer 114 with the first UE 107. For example, the RAN 102 may establish an E-UTRAN NR-Dual Connectivity (ENDC) connection with the first UE 107. Both the eNodeB 104 and the gNodeB 106 may exchange data with the first UE 107 over the split radio bearer 114.

Similarly, the second UE 109 may connect to the RAN 102. Upon receiving the broadcast signal from the eNodeB 106, the second UE 109 may transmit a connection request to the RAN 102. In some cases, the connection request is transmitted to the eNodeB 106 over sub-EHF radio resources. According to some examples, the connection request indicates that the second UE 109 is configured to receive and/or transmit data over EHF radio resources. The second UE 109 may attach to the RAN 102, such that a default radio bearer may be established between the second UE 109 and the RAN 102. At this stage, uplink and downlink data can be exchanged between the second UE 109 and the eNodeB 106.

The RAN 102 may determine whether to connect to the second UE 109 via the gNodeB 108, which may communicate with the second UE 109 over EHF radio resources. In some cases, the RAN 102 may cause the gNodeB 108 to transmit one or more messages over a EHF radio channel to the second UE 109. In some cases, the messages can include at least one RRC message. Based on the one or more messages as-received by the second UE 109, the first UE 107 may transmit a measurement report to the eNodeB 106. For example, the second UE 109 may transmit a B1 measurement report that indicates whether the second UE 109 reliably received the one or more messages from the gNodeB 108, and which may indicate whether the second UE 109 and the gNodeB 108 are able to reliably communicate via the EHF radio resources. In various examples, the measurement report transmitted by second UE 109 may indicate, to the RAN 102, that the second UE 109 is located in a EHF coverage area of the RAN 102.

In addition, the RAN 102 may also determine whether to connect to the second UE 109 via the gNodeB 108 based on the velocity of the second UE 109. In some cases, the RAN 102 may identify the velocity of the second UE 109 based on a Doppler shift and/or a fading condition of the measurement report transmitted to the RAN 102 or some other signal transmitted between the second UE 109 and the RAN 102. Thus, in some cases, the RAN 102 may measure the velocity of the second UE 109 based on signaling between the RAN 102 and the second UE 109.

In some cases, the RAN 102 may send a velocity request to the second UE 109, which may cause the second UE 109 to measure and/or report the velocity of the second UE 109 and to transmit the velocity in a response to the RAN 102. In some cases, the second UE 109 may include GPS receiver, and the second UE 109 may identify a position of the second UE 109 based on GPS signals received by the GPS receiver. In some cases, the second UE 109 may measure its positions at a first time and at a second time, and may calculate the velocity of the second UE 109 by dividing the distance between the position at the first time and the position at the second time with a difference between the first time and the second time.

The second UE 109 may determine the velocity of the second UE 109 in any of a variety of other ways. In some cases, the second UE 109 may include an accelerometer and/or motion sensor and may calculate the velocity of the second UE 109 based on measurements by the accelerometer and/or motion sensor. In some cases, the second UE 109 may be connected to or integrated within a vehicle that includes a speedometer, and the second UE 109 can determine the velocity of the second UE 109 based on a speed measured by the speedometer. The second UE 109 may generate and transmit a response to the RAN 102 that indicates the velocity of the second UE 109.

In some cases, the velocity of the second UE 109 includes a speed of the second UE 109 in a particular direction. In various examples, the rate at which the second UE 109 is traveling towards the RAN 102 may actually decrease the chance that the obstruction 110 will arise between the second UE 109 and the RAN 102. Thus, in some examples, the direction at which the speed is assessed may be a radial direction from the RAN 102 to the second UE 109, such that the speed indicates a rate at which the second UE 109 is traveling away from the RAN 102. In some cases, the direction may be tangential to the second UE 109, such that the speed indicates a rate at which the second UE 109 is traveling around the RAN 102.

In various examples, the RAN 102 may compare the velocity of the second UE 109 to the velocity threshold. In some cases, the RAN 102 may determine that the velocity of the second UE 109 is greater than or equal to the velocity threshold. In response to determining that the velocity of the second UE 109 is greater than or equal to the velocity threshold, the eNodeB 104 may continue to exchange data wirelessly with the second UE 109 over sub-EHF radio resources. The RAN 102 may refrain from establishing a connection between the gNodeB 106 and the second UE 109 over EHF radio resources. That is, despite the fact that the second UE 109 is capable of communicating over EHF radio resources and the measurement report from the second UE 109 indicates that the second UE 109 is in a coverage area of the gNodeB 108, the RAN 102 may refrain from communicating with the second UE 109 over a EHF radio bearer. In some cases, the RAN 102 may establish a single radio bearer 118 with the second UE 109. For example, the eNodeB 104 may exchange data wirelessly with the second UE 109.

Accordingly, in various implementations described herein, the RAN 102 can connect to devices traveling less than the threshold velocity (e.g., the first UE 107) via EHF radio resources (e.g., split radio bearers) and may connect to devices travelling greater than or equal to the threshold velocity (e.g., the second UE 109) via sub-EHF radio resources (e.g., single radio bearers). Accordingly, the devices traveling less than the threshold velocity may have increased bandwidth from split radio bearers, but may transmit and/or receive signals wirelessly without a significant risk of interruptions due to obstructions (e.g., the obstruction 110) within the environment 100.

Figure 2A:
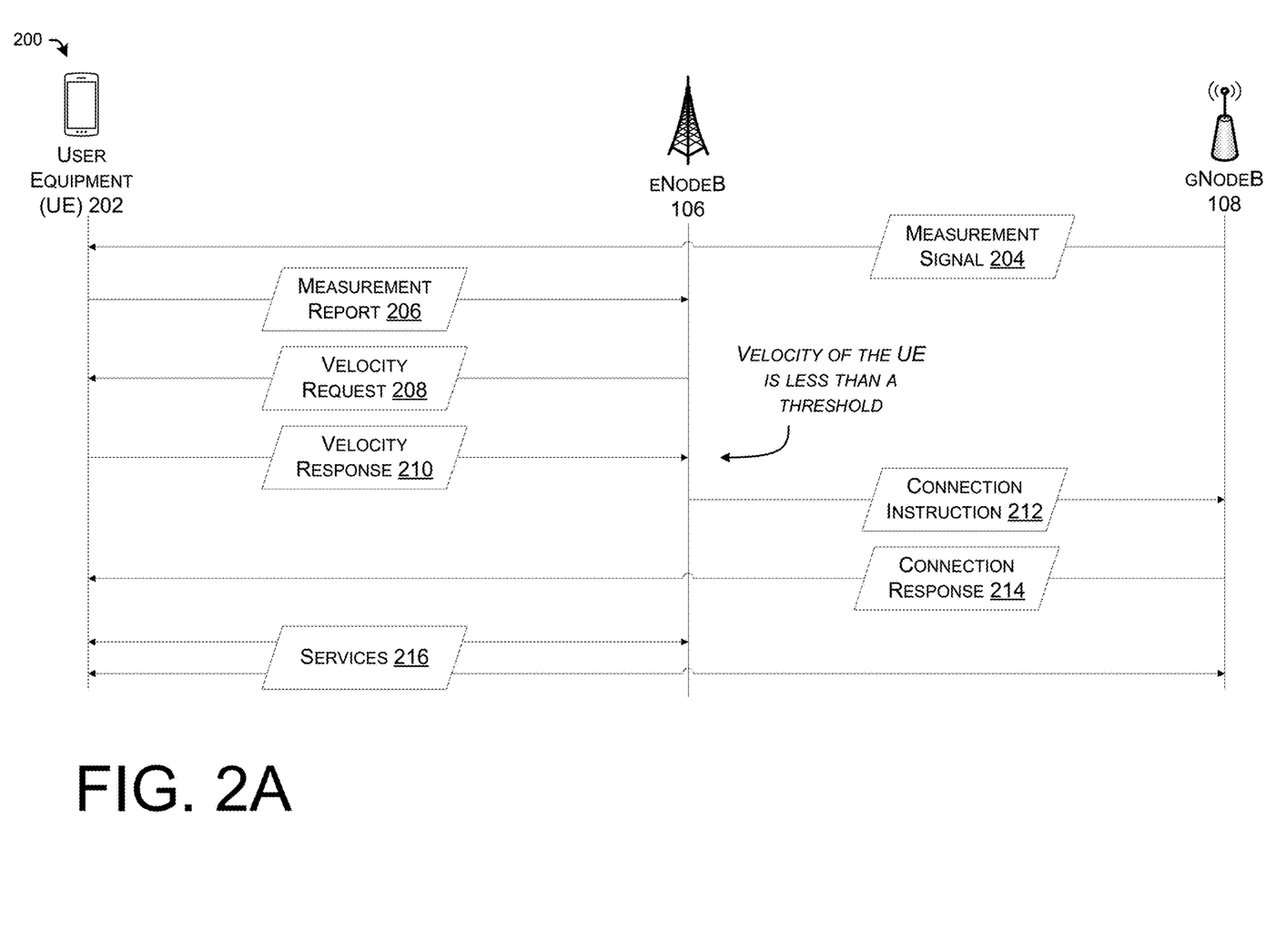
FIG. 2A illustrates example signaling for establishing a split radio bearer with a device that is traveling at less than a threshold velocity.
Figure 2B:
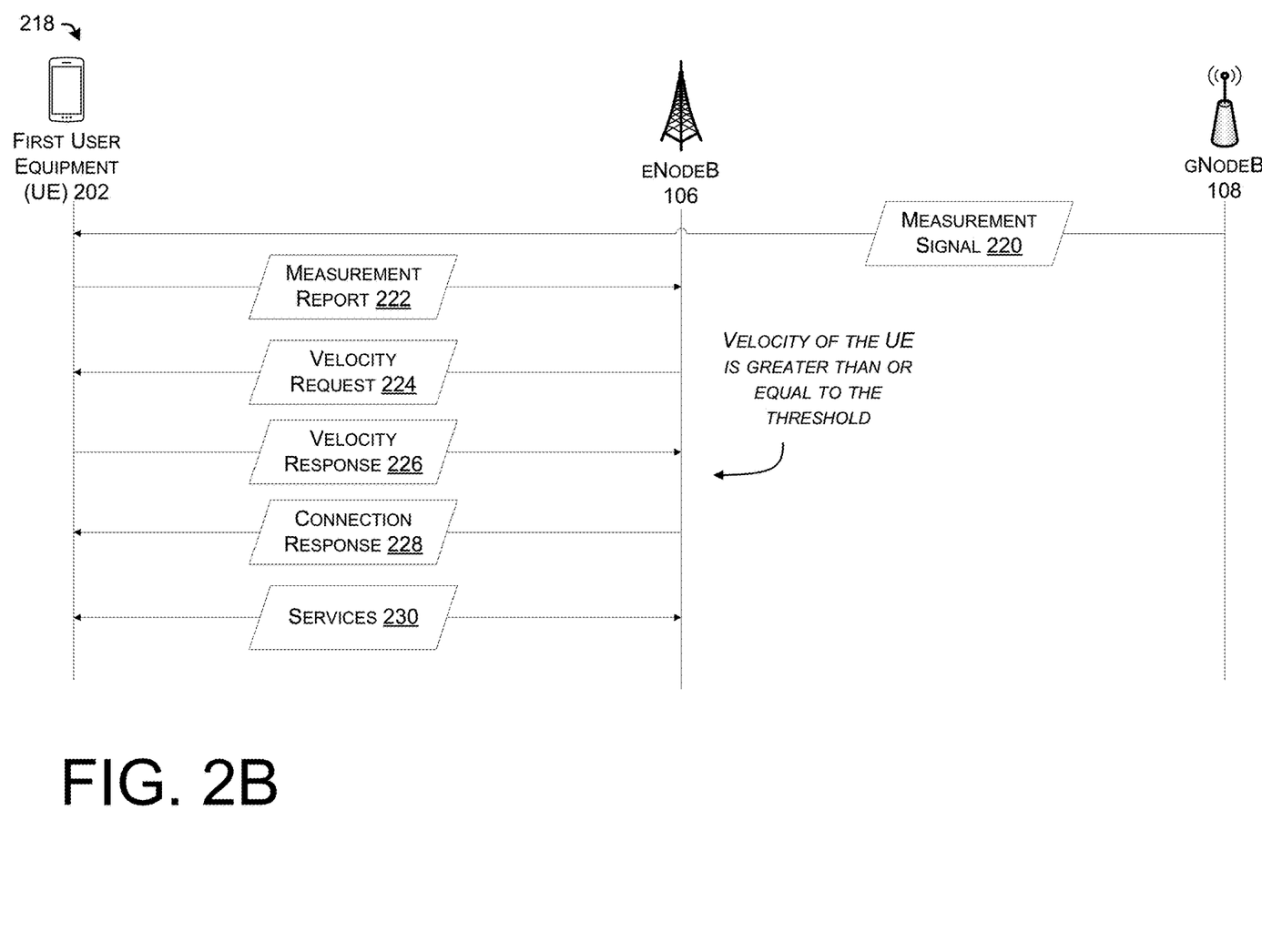
FIG. 2B illustrates example signaling for establishing a single radio bearer with a device that is traveling at greater than or equal to a threshold velocity.

FIGS. 2A and 2B illustrate examples of transmissions that can be used to selectively establish connections over EHF radio resources based on device velocity. FIG. 2A illustrates example signaling 200 for establishing a split radio bearer with a device that is traveling at less than a threshold velocity. As shown, the signaling 200 is between a UE 202, the eNodeB 106, and the gNodeB 108. The UE 202 may include, for instance, the first UE 107 or the second UE 109 described above with reference to FIG. 1. In some cases, the signaling 200 can occur after a default bearer has been established between the UE 202 and the eNodeB 106. Although the signaling 200 is described as though the eNodeB 106 is a primary mode that controls the gNodeB 108, implementations are not so limited.

The gNodeB 108 may transmit a measurement signal 204 to the UE 202. According to various implementations, the measurement signal 204 may be transmitted over an EHF radio bearer. In some cases, the measurement signal 204 can be scheduled for transmission during a predetermined measurement gap. The measurement signal 204 may include a primary synchronization signal, a secondary synchronization signal, or a combination thereof.

The UE 202 may measure a quality of the measurement signal 204 as-received by the UE 202, and may transmit a measurement report 206 to the eNodeB 106. The measurement report 206 may indicate the signal quality of the measurement signal 204 as-received by the UE 202. For example, if the UE 202 is located within a coverage area of the gNodeB 108, the signal quality of the measurement signal 204 as-received by the UE 202 may be relatively high. In the example of FIG. 2, the measurement report 206 indicates that the signal quality of the measurement signal 204 is sufficient to support reliable communication between the UE 202 and the gNodeB 108. The measurement report 206 may be transmitted to the eNodeB 106 over a sub-EHF uplink channel that had been previously established (e.g., as a default radio bearer) between the UE 202 and the eNodeB 106.

In response to receiving the measurement report 206 indicating that the UE 202 is in the coverage area of the gNodeB 108, the eNodeB 106 may transmit a velocity request 208 to the UE 202. The velocity request 208 may be transmitted over a sub-EHF downlink channel that had been previously established (e.g., as a default radio bearer) between the UE 202 and the eNodeB 106. The velocity request 208 may be a request for the UE 202 to measure the velocity of the UE 202 and to report the velocity of the UE 202 to the eNodeB 106.

The UE 202 may determine the velocity of the UE 202 in response to receiving the velocity request 208. For example, the UE 202 may measure the velocity of the UE 202 using a speedometer, a GPS device, or the like. In some cases, The UE 202 transmit a velocity response 210 to the eNodeB 106 indicating the velocity. The velocity response 210 may be transmitted over the sub-EHF uplink channel.

Although not illustrated in FIG. 2A, in some examples, the velocity of the UE 202 can be determined by the eNodeB 106 using other techniques. For example, the eNodeB 106 may determine a fading condition and/or a Doppler shift of a transmission between the UE 202 and the eNodeB 106 and determine the velocity of the UE 202 based on the fading condition and/or the Doppler shift. For example, the eNodeB 106 may be aware of a frequency at which the transmission is sent by the UE 202 (e.g., a frequency of an uplink channel established between the UE 202 and the eNodeB 106). The eNodeB 106 may compare the frequency at which the transmission is sent by the UE 202 to a frequency at which the transmission is received by the eNodeB 106. If, for example, the frequency at which the transmission is received by the eNodeB 106 is lower than the frequency at which the transmission is transmitted by the UE 202, then the eNodeB 106 can determine that the UE 202 was moving away from the eNodeB 106 while emitting the transmission. The magnitude of the frequency shift can correspond to the velocity of the UE 202 in a radial direction extending from the eNodeB 106. In some examples, the transmission could be the measurement report 206. Thus, in some cases, the velocity request 208 and the velocity response 210 can be omitted from the signaling 200.

In various examples, the velocity of the UE 202 is below a threshold velocity. In some cases, the velocity response 210 may indicate that the speed of the UE 202 (e.g., in a direction that points away from the eNodeB 106 and/or the gNodeB 108 and/or a direction that is tangential with respect to a circle centered on the eNodeB 106 and/or the gNodeB 108) is below a threshold speed. Accordingly, a split radio bearer may be established between the UE 202 and both the eNodeB 106 and the gNodeB 108.

The eNodeB 106 may transmit a connection instruction 212 to the gNodeB 108. In some cases, the connection instruction 212 includes a secondary carrier addition request that specifies the UE 202. The connection instruction 212 may request, from the gNodeB 108, a EHF bearer for the UE 202.

In various cases, the gNodeB 108 may indicate the allocated EHF bearer to the UE 202 in a connection response 214 transmitted from the gNodeB 108 to the UE 202. In some cases, the connection response 214 is transmitted via the eNodeB 106. In some cases, the connection response 214 may include an addition request acknowledgement and/or an RRC connection setup message that carries a configuration of the EHF bearer for the UE 202.

The UE 202 may exchange services 216 with the eNodeB 106 and the gNodeB 108 over a split radio bearer. The split radio bearer can include a sub-EHF channel over which data is transmitted between the UE 202 and the eNodeB 106 as well as a EHF channel over which data is transmitted between the UE 202 and the gNodeB 108. The services can include any of a variety of services, including voice services, data services, or the like.

FIG. 2B illustrates example signaling 218 for establishing a single radio bearer with a device that is traveling at greater than or equal to a threshold velocity. As shown, the signaling 218 is between the UE 202, the eNodeB 106, and the gNodeB 108. In some cases, the signaling 218 can occur after a default bearer has been established between the UE 202 and the eNodeB 106. Although the signaling 200 is described as though the eNodeB 106 is a primary mode that controls the gNodeB 108, implementations are not so limited.

The gNodeB 108 may transmit a measurement signal 220 to the UE 202. According to various implementations, the measurement signal 220 may be transmitted over an EHF radio bearer. In some cases, the measurement signal 220 can be scheduled for transmission during a predetermined measurement gap. The measurement signal 220 may include a primary synchronization signal, a secondary synchronization signal, or a combination thereof.

The UE 202 may measure a quality of the measurement signal 220 as-received by the UE 202, and may transmit a measurement report 222 to the eNodeB 106. The measurement report 222 may indicate the signal quality of the measurement signal 220 as-received by the UE 202. For example, if the UE 202 is located within a coverage area of the gNodeB 108, the signal quality of the measurement signal 220 as-received by the UE 202 may be relatively high. In the example of FIG. 2, the measurement report 222 indicates that the signal quality of the measurement signal 220 is sufficient to support reliable communication between the UE 202 and the gNodeB 108. The measurement report 222 may be transmitted to the eNodeB 106 over a sub-EHF uplink channel that had been previously established (e.g., as a default radio bearer) between the UE 202 and the eNodeB 106.

In response to receiving the measurement report 222 indicating that the UE 202 is in the coverage area of the gNodeB 108, the eNodeB 106 may transmit a velocity request 224 to the UE 202. The velocity request 224 may be transmitted over a sub-EHF downlink channel that had been previously established (e.g., as a default radio bearer) between the UE 202 and the eNodeB 106. The velocity request 224 may be a request for the UE 202 to measure the velocity of the UE 202 and to report the velocity of the UE 202 to the eNodeB 106.

The UE 202 may determine the velocity of the UE 202 in response to receiving the velocity request 224. For example, the UE 202 may measure the velocity of the UE 202 using a speedometer, a GPS device, or the like. In some cases, The UE 202 transmit a velocity response 226 to the eNodeB 106 indicating the velocity. The velocity response 226 may be transmitted over the sub-EHF uplink channel.

Although not illustrated in FIG. 2A, in some examples, the velocity of the UE 202 can be determined by the eNodeB 106 using other techniques. For example, the eNodeB 106 may determine a fading condition and/or a Doppler shift of a transmission between the UE 202 and the eNodeB 106 and determine the velocity of the UE 202 based on the fading condition and/or the Doppler shift. For example, the eNodeB 106 may be aware of a frequency at which the transmission is sent by the UE 202 (e.g., a frequency of an uplink channel established between the UE 202 and the eNodeB 106). The eNodeB 106 may compare the frequency at which the transmission is sent by the UE 202 to a frequency at which the transmission is received by the eNodeB 106. If, for example, the frequency at which the transmission is received by the eNodeB 106 is lower than the frequency at which the transmission is transmitted by the UE 202, then the eNodeB 106 can determine that the UE 202 was moving away from the eNodeB 106 while emitting the transmission. The magnitude of the frequency shift can correspond to the velocity of the UE 202 in a radial direction extending from the eNodeB 106. In some examples, the transmission could be the measurement report 222. Thus, in some cases, the velocity request 224 and the velocity response 226 can be omitted from the signaling 200.

In various examples, the velocity of the UE 202 is greater than or equal to a threshold velocity. In some cases, the velocity response 226 may indicate that the speed of the UE 202 (e.g., in a direction that points away from the eNodeB 106 and/or the gNodeB 108 and/or a direction that is tangential with respect to a circle centered on the eNodeB 106 and/or the gNodeB 108) is greater than or equal to a threshold speed. Accordingly, a single radio bearer may be utilized to exchange data wirelessly between the UE 202 and the eNodeB 106.

The eNodeB 106 may transmit a connection response 228 to the UE 202. The connection response 228 may indicate a configuration of a sub-EHF, single radio bearer between the UE 202 and the eNodeB 106 for the exchange of data between the UE 202 and the eNodeB 106. For example, the connection response 228 can be an RRC connection setup message.

The UE 202 may exchange services 230 with the eNodeB 106 over the single radio bearer. Despite the UE 202 being located in a coverage area of the gNodeB 108, the UE 202 and the gNodeB 108 may not exchange data wirelessly over EHF radio resources due to the velocity of the UE 202. The services can include any of a variety of services, including voice services, data services, or the like.

Figure 3:
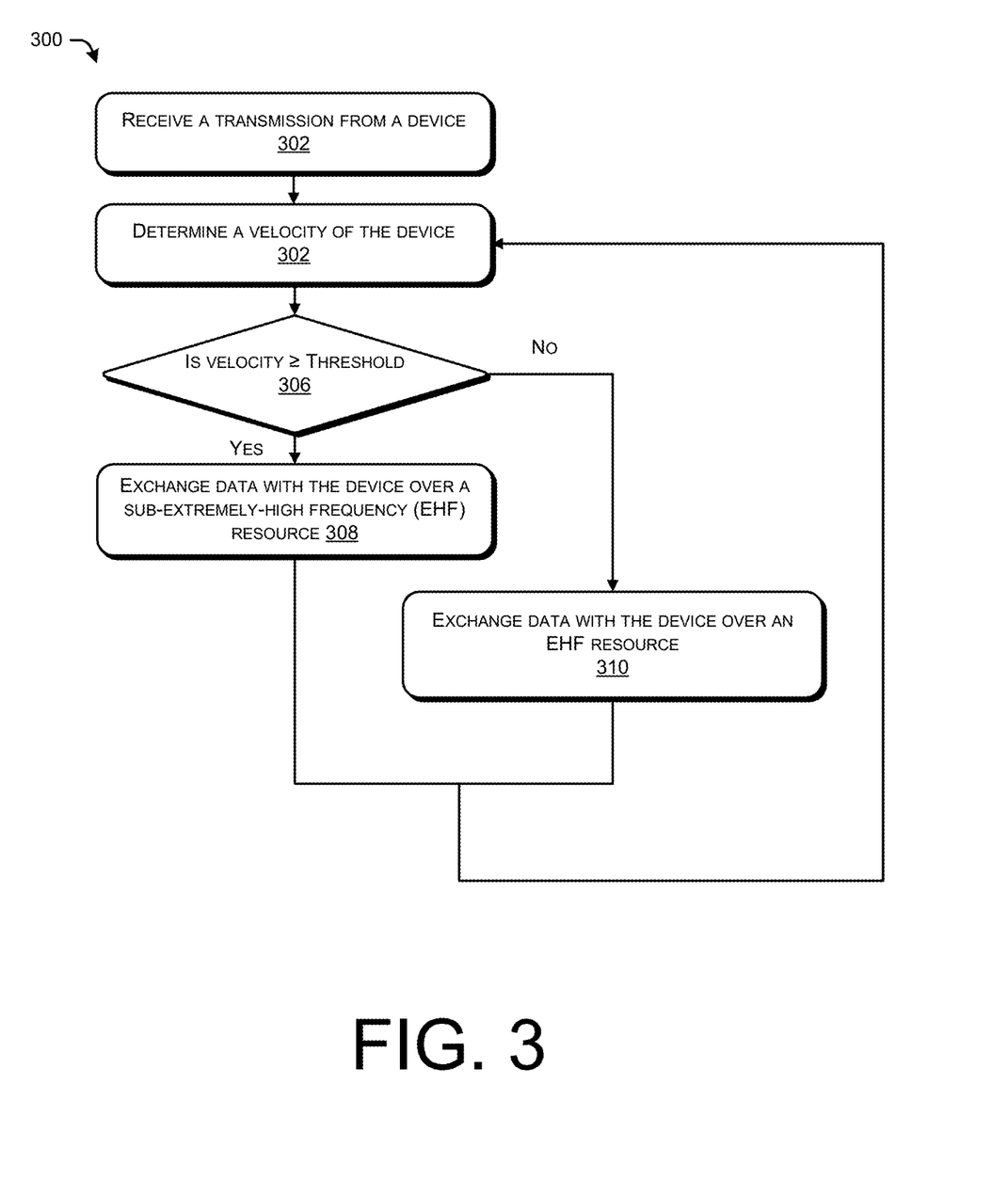
FIG. 3 illustrates an example process for selectively connecting to a device over EHF radio resources based on a velocity of the device.

FIG. 3 illustrates an example process 300 for selectively connecting to a device over EHF radio resources based on a velocity of the device. The process 300 can be performed by an entity including the RAN 102 and/or the eNodeB 104 described above with reference to FIGS. 1, 2A, and 2B.

At 302, the entity receives a transmission from a device. According to various instances, the device can be a UE. In various examples, the transmission can include one or more wireless signals. In some cases, the transmission is transmitted over a sub-EHF radio resource that has been previously established between the device and the entity.

In some cases, the transmission includes a measurement report that indicates a quality of a signal received by the device over a EHF radio resource. For example, a gNodeB associated with the entity may have transmitted a measurement signal to the device and the device may have measured the signal quality of the measurement signal. In various cases, the measurement report indicates that the quality of the signal is above a threshold. For example, the measurement report may indicate that the device is in a coverage area of the gNodeB.

At 304, the entity determines a velocity of the device. In some examples, the entity may exchange a velocity request and a velocity report with the device. The velocity request may instruct the device to measure the velocity of the device and report the velocity of the device to the entity. The velocity report may be generated by the device and may encode the measured velocity. Accordingly, the entity may determine the velocity of the device by extracting the velocity from the velocity report.

In some cases, the entity may determine the velocity of the device based on a characteristic of a signal received by the entity from the device. The entity may derive the velocity of the device based on a fading condition and/or a Doppler shift of a signal transmitted between the entity and the device. For example, the entity may be aware of a frequency at which a signal is transmitted from the device to the entity. The entity may compare the frequency at which the signal is transmitted from the device to the frequency of the signal as-received by the entity. A discrepancy between these frequencies can correspond to a Doppler shift, which is indicative of a relative velocity between the entity and the device. Thus, the entity may determine the velocity of the device.

At 306, the entity determines whether the velocity is greater than or equal to a threshold. In some examples, the threshold is predetermined. In some cases, the threshold can be adapted based on real-time network conditions (e.g., interference) within a cell region of the entity.

If the entity determines that the velocity is greater than or equal to the threshold, then the process 300 proceeds to 308. At 308, the entity exchanges data with the device over a sub-EHF resource. For example, the entity may transmit one or more signals to the device over the sub-EHF resource. In some cases, the entity may receive one or more signals from the device over the sub-EHF resource. The entity may refrain from exchanging data wirelessly with the device over a EHF resource when the device is determined to be traveling at the velocity that is greater than or equal to the threshold.

If, on the other hand, the entity determines that the velocity is less than the threshold, then the process 300 proceeds to 310. At 310, the entity exchanges data with the device over a EHF resource. For example, the entity may transmit one or more signals to the device over the EHF resource. In some examples, the entity may receive one or more signals from the device over the EHF resource. In some cases, the entity may also exchange data wirelessly with the device over a sub-EHF resource via a dual radio bearer.

After the entity performs 308 or 310, the process returns back to 302. Accordingly, the velocity of the device can be reassessed multiple times (e.g., periodically) to determine whether data should be exchanged with the device over the EHF resource.

Figure 4:
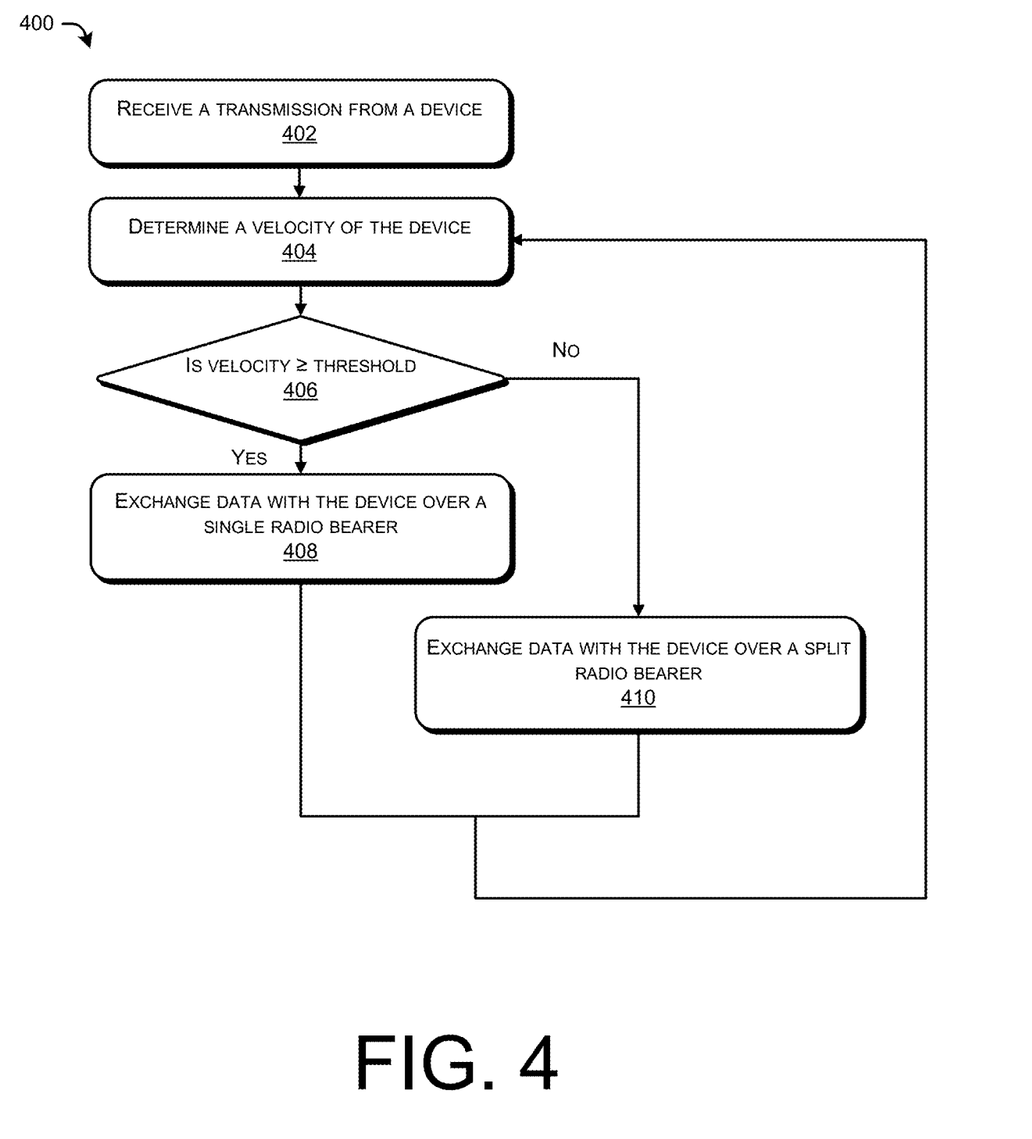
FIG. 4 illustrates an example process for selectively connecting to a device over a split radio bearer based on a velocity of the device.

FIG. 4 illustrates an example process 400 for selectively connecting to a device over a split radio bearer based on a velocity of the device. The process 400 can be performed by an entity including the RAN 102 and/or the eNodeB 104 described above with reference to FIGS. 1, 2A, and 2B.

At 402, the entity receives a transmission from a device. According to various instances, the device can be a UE. In some cases, the transmission includes a measurement report that indicates a quality of a signal received by the device over a EHF radio resource. For example, a gNodeB associated with the entity may have transmitted a measurement signal to the device and the device may have measured the signal quality of the measurement signal. In various cases, the measurement report indicates that the quality of the signal is above a threshold. For example, the measurement report may indicate that the device is in a coverage area of the gNodeB.

At 404, the entity determines a velocity of the device. In some examples, the entity may exchange a velocity request and a velocity report with the device. The velocity request may instruct the device to measure the velocity of the device and report the velocity of the device to the entity. The velocity report may be generated by the device and may encode the measured velocity. Accordingly, the entity may determine the velocity of the device by extracting the velocity from the velocity report.

In some cases, the entity may determine the velocity of the device based on a characteristic of a signal received by the entity from the device. The entity may derive the velocity of the device based on a fading condition and/or a Doppler shift of a signal transmitted between the entity and the device. For example, the entity may be aware of a frequency at which a signal is transmitted from the device to the entity. The entity may compare the frequency at which the signal is transmitted from the device to the frequency of the signal as-received by the entity. A discrepancy between these frequencies can correspond to a Doppler shift, which is indicative of a relative velocity between the entity and the device. Thus, the entity may determine the velocity of the device.

At 406, the entity determines whether the velocity is greater than or equal to a threshold. In some examples, the threshold is predetermined. In some cases, the threshold can be adapted based on real-time network conditions (e.g., interference) within a cell region of the entity.

If the velocity is determined to be greater than or equal to the threshold at 406, then the process 400 proceeds to 408. At 408, the entity exchanges data with the device over a single radio bearer. For example, the entity may transmit, over a sub-EHF bearer, one or more wireless signals to the device. In various cases, the entity may receive, over a sub-EHF bearer, one or more wireless signals from the device.

If, on the other hand, the velocity is determined to be less than the threshold at 406, then the process 400 proceeds to 410. At 410, the entity exchanges data with the device over a split radio bearer. For instance, the entity may transmit, over a sub-EHF bearer and an EHF bearer, one or more wireless signals to the device. In some cases, the entity may receive, over a sub-EHF bearer and an EHF bearer, one or more wireless signals from the device.

After the entity performs 408 or 410, the process returns back to 402. Accordingly, the velocity of the device can be reassessed multiple times (e.g., periodically) to determine whether data should be exchanged with the device over a split radio bearer or a single radio bearer.

Figure 5:
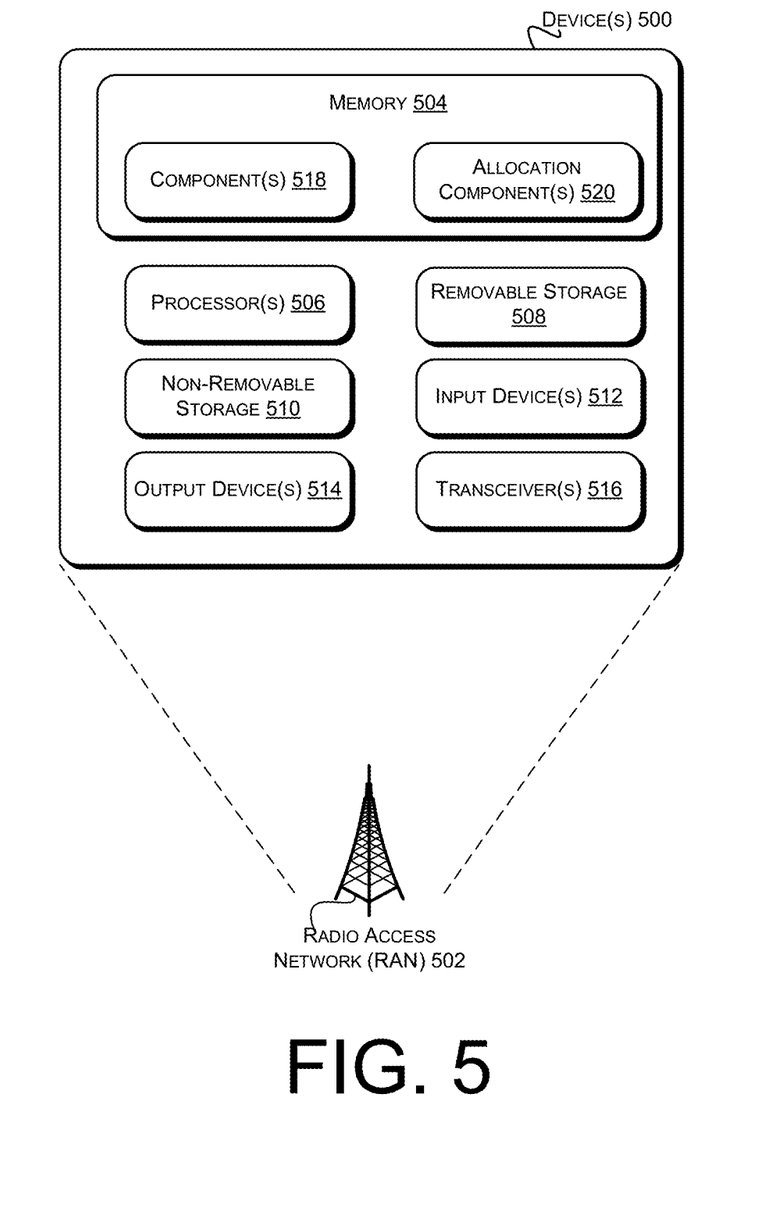
FIG. 5 illustrates an example of a radio access network (RAN).

FIG. 5 illustrates an example of at least one device 500, which may be incorporated into a RAN 502. The device(s) 500 that includes any of memory 504, processor(s) 506, removable storage 508, non-removable storage 510, input device(s) 512, output device(s) 514, and transceiver(s) 516. The device(s) 500 may be configured to perform various methods and functions disclosed herein.

The memory 504 may include component(s) 518. The component(s) 518 may include at least one of instruction(s), program(s), database(s), software, operating system(s), etc. In some implementations, the component(s) 518 include instructions that are executed by processor(s) 506 and/or other components of the device(s) 500. The memory 504 may store, for example, allocation component(s) 520 which, when executed by the processor(s) 506, cause the device(s) 500 to perform any of the functionality described herein. For example, the allocation component(s) 520 can include instructions for determining a velocity of a UE and selectively connecting the device(s) 500 to the UE over a split radio bearer and/or EHF radio resources based on the velocity.

In some embodiments, the processor(s) 506 include a central processing unit (CPU), a graphics processing unit (GPU), or both CPU and GPU, or other processing unit or component known in the art.

The device(s) 500 may also include additional data storage devices (removable and/or non-removable) such as, for example, magnetic disks, optical disks, or tape. Such additional storage is illustrated in FIG. 5 by removable storage 508 and non-removable storage 510. Tangible computer-readable media can include volatile and non-volatile, removable and non-removable media implemented in any method or technology for storage of information, such as computer readable instructions, data structures, program modules, or other data. The memory 504, the removable storage 508, and the non-removable storage 510 are all examples of computer-readable storage media. Computer-readable storage media include, but are not limited to, Random Access Memory (RAM), Read-Only Memory (ROM), Electrically Erasable Programmable Read-Only Memory (EEPROM), flash memory, or other memory technology, Compact Disk Read-Only Memory (CD-ROM), Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device(s) 500. Any such tangible computer-readable media can be part of the device(s) 500.

The device(s) 500 may be configured to communicate over a telecommunications network using any common wireless and/or wired network access technology. Moreover, the device(s) 500 may be configured to run any compatible device Operating System (OS). The device(s) 500 also can include input device(s) 512, such as a keypad, a cursor control, a touch-sensitive display, voice input device, etc., and output device(s) 514 such as a display, speakers, printers, etc.

As illustrated in FIG. 5, the device(s) 500 also includes one or more wired or wireless transceiver(s) 516. For example, the transceiver(s) 516 can include a network interface card (NIC), a network adapter, a Local Area Network (LAN) adapter, or a physical, virtual, or logical address to connect to various network components, for example. To increase throughput when exchanging wireless data, the transceiver(s) 216 can utilize multiple-input/multiple-output (MIMO) technology. The transceiver(s) 516 can comprise any sort of wireless transceivers capable of engaging in wireless, radio frequency (RF) communication. The transceiver(s) 516 can also include other wireless modems, such as a modem for engaging in Wi-Fi, WiMAX, Bluetooth, infrared communication, and the like. Each one of the transceiver(s) 516 may include transmitter(s), receiver(s), or both. In some cases, the transceiver(s) 516 include at least one transceiver configured to transmit and/or receive wireless signals over EHF radio resources and/or at least one transceiver configured to transmit and/or receive wireless signals over sub-EHF radio resources (e.g., LTE radio bands).

EXAMPLE CLAUSES

A: A radio access network (RAN) including: a first transceiver; a second transceiver; one or more processors; a memory; and one or more components stored in the memory and executable by the one or more processors to perform operations including: receiving, from a user equipment (UE), a first wireless signal; determining, based on a fading condition of the first wireless signal, a velocity of the UE in a radial direction from the RAN to the UE; determining that the velocity of the UE is less than a threshold velocity; and in response to determining that the velocity of the UE is less than the threshold velocity, establishing a split radio bearer between the RAN and the UE by: causing the first transceiver to transmit a second wireless signal to the UE, the second wireless signal having a first frequency that is greater than or equal to 30 gigahertz (GHz) and less than or equal to 300 GHz; and causing the second transceiver to transmit a third wireless signal to the UE, the third wireless signal having a second frequency that is greater than or equal to 400 Megahertz (MHz) and less than 30 GHz.

B. The RAN of clause A, the UE being a first UE, the velocity being a first velocity, the method further including: receiving, from a second UE, a fourth wireless signal with a third frequency that is greater than or equal to 400 MHz and less than 30 GHz; determining a second velocity of the second UE based on the fourth wireless signal; determining that the second velocity of the second UE is greater than or equal to the threshold velocity; and based on determining that the second velocity of the second UE is greater than or equal to the threshold velocity, establishing a single radio bearer between the RAN and the second UE by: causing the first transceiver to transmit, to the second UE, a fifth wireless signal with a fourth frequency that is greater than or equal to 400 MHz and less than 30 GHz C. The RAN of clause A or B, the velocity being a first velocity, the operations further including: receiving, from the UE, a fourth wireless signal; determining a second velocity of the UE based on the fourth wireless signal; determining that the second velocity of the second UE is greater than or equal to the threshold velocity; and based on determining that the second velocity of the UE is greater than or equal to the threshold velocity, ending the split radio bearer and establishing a single radio bearer between the RAN and the UE by causing the first transceiver to transmit, to the UE, a fifth wireless signal with a third frequency that is greater than or equal to 400 MHz and less than 30 GHz.

D. A method, including: receiving, from a user equipment (UE), a first wireless signal with a sub-extremely high frequency (EHF) frequency; determining a velocity of the UE based on the first wireless signal; determining that the velocity of the UE is less than a threshold velocity; and based on determining that the velocity of the UE is less than the threshold velocity, transmitting, to the UE, a second wireless signal with an EHF frequency.

E. The method of claim D, wherein determining the velocity of the UE based on the first wireless signal includes: determining a Doppler shift in the first wireless signal; and determining the velocity of the UE based on the Doppler shift.

F. The method of clause D or E, wherein the velocity of the UE is encoded in the first wireless signal and determining the velocity of the UE based on the first wireless signal includes: extracting the velocity from the first wireless signal.

G. The method of any one of clauses D to F, wherein the method is performed by a radio access network (RAN) and the velocity includes a speed of the UE in a radial direction away from the RAN.

H. The method of clause G, wherein the RAN includes an eNodeB and a gNodeB, the eNodeB receiving the first wireless signal, the gNodeB transmitting the second wireless signal.

I. The method of any one of clauses D to H, the sub-EHF frequency being a first sub-EHF frequency, the method further including: based on determining that the velocity of the UE is less than the threshold velocity, transmitting, to the UE, a third wireless signal with a second sub-EHF frequency.

J. The method of any one of clauses D to I, the EHF frequency being a first EHF frequency, the method further including: based on determining that the velocity of the UE is less than the threshold velocity, receiving, from the UE, a third wireless signal with a second EHF frequency.

K. The method of any one of clauses D to J, the UE being a first UE, the sub-EHF frequency being a first sub-EHF frequency, the velocity being a first velocity, the method further including: receiving, from a second UE, a third wireless signal with a second sub-EHF frequency; determining a second velocity of the second UE based on the third wireless signal; determining that the second velocity of the second UE is greater than or equal to the threshold velocity; and based on determining that the second velocity of the second UE is greater than or equal to the threshold velocity, transmitting, to the second UE, a fourth wireless signal with a third sub-EHF frequency.

L. The method of any one of clauses D to K, the velocity being a first velocity, the sub-EHF frequency being a first sub-EHF frequency, the method further including: receiving, from the UE, a third wireless signal; determining a second velocity of the UE based on the third wireless signal; determining that the second velocity of the second UE is greater than or equal to the threshold velocity; and based on determining that the second velocity of the UE is greater than or equal to the threshold velocity, transmitting, to the UE, a fourth wireless signal with a second sub-EHF frequency.

M. A system, including: at least one transceiver; at least one processor; and memory storing instructions that, when executed by the at least one processor, cause the system to perform operations including: receiving, by the at least one transceiver from a user equipment (UE), a first wireless signal with a first frequency that is less than 30 Gigahertz (GHz); determining a velocity of the UE based on the first wireless signal; determining that the velocity of the UE is less than a threshold velocity; and based on determining that the velocity of the UE is less than the threshold velocity, transmitting, by the at least one transceiver to the UE, a second wireless signal with a second frequency that is greater than or equal to 30 GHz.

N. The system of clause M, wherein determining the velocity of the UE based on the first wireless signal includes: determining a Doppler shift in the first wireless signal; and determining the velocity of the UE based on the Doppler shift.

O. The system of clause M or N, wherein the velocity of the UE is encoded in the first wireless signal and determining the velocity of the UE based on the first wireless signal includes: extracting the velocity from the first wireless signal.

P. The system of any one of clauses M to O, wherein the velocity includes a speed of the UE in a radial direction away from the system.

Q. The system of any one of clauses M to P, wherein the operations further include: based on determining that the velocity of the UE is less than the threshold velocity, transmitting, by the at least one transceiver to the UE, a third wireless signal with a third frequency that is less than 30 GHz.

R. The system of any one of clauses M to Q, wherein the operations further include: based on determining that the velocity of the UE is less than the threshold velocity, receiving, by the at least one transceiver from the UE, a third wireless signal with a third frequency that is greater than 30 GHz.

S. The system of any one of clauses M to R, the UE being a first UE, the velocity being a first velocity, the operations further including: receiving, by the at least one transceiver from a second UE, a third wireless signal with a third frequency that is less than 30 GHz; determining a second velocity of the second UE based on the third wireless signal; determining that the second velocity of the second UE is greater than or equal to the threshold velocity; and based on determining that the second velocity of the second UE is greater than or equal to the threshold velocity, transmitting, by the at least one transceiver to the second UE, a fourth wireless signal with a fourth frequency that is less than 30 GHz.

T. The system of any one of clauses M to S, the velocity being a first velocity, the operations further including: receiving, by the at least one transceiver from the UE, a third wireless signal; determining a second velocity of the UE based on the third wireless signal; determining that the second velocity of the second UE is greater than or equal to the threshold velocity; and based on determining that the second velocity of the UE is greater than or equal to the threshold velocity, transmitting, by the at least one transceiver to the UE, a fourth wireless signal with a third frequency that is less than 30 GHz.

While the example clauses described above are described with respect to one particular implementation, it should be understood that, in the context of this document, the content of the example clauses can also be implemented via a method, device, system, a computer-readable medium, and/or another implementation.

CONCLUSION

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A radio access network (RAN) comprising:
a first transceiver;
a second transceiver;
one or more processors;
a memory; and
one or more components stored in the memory and executable by the one or more processors to perform operations comprising:
receiving, from a user equipment (UE), a first wireless signal;
determining, based on a fading condition of the first wireless signal, a velocity of the UE in a radial direction from the RAN to the UE;
determining that the velocity of the UE is less than a threshold velocity; and
in response to determining that the velocity of the UE is less than the threshold velocity, establishing a split radio bearer between the RAN and the UE by:
causing the first transceiver to transmit a second wireless signal to the UE, the second wireless signal having a first frequency that is greater than or equal to 30 gigahertz (GHz) and less than or equal to 300 GHz; and
causing the second transceiver to transmit a third wireless signal to the UE, the third wireless signal having a second frequency that is greater than or equal to 400 Megahertz (MHz) and less than 30 GHz.

2. The RAN of claim 1, the UE being a first UE, the velocity being a first velocity, the operations further comprising:
receiving, from a second UE, a fourth wireless signal with a third frequency that is greater than or equal to 400 MHz and less than 30 GHz;
determining a second velocity of the second UE based on the fourth wireless signal;
determining that the second velocity of the second UE is greater than or equal to the threshold velocity; and
based on determining that the second velocity of the second UE is greater than or equal to the threshold velocity, establishing a single radio bearer between the RAN and the second UE by:
causing the first transceiver to transmit, to the second UE, a fifth wireless signal with a fourth frequency that is greater than or equal to 400 MHz and less than 30 GHz.

3. The RAN of claim 1, the velocity being a first velocity, the operations further comprising:
receiving, from the UE, a fourth wireless signal;
determining a second velocity of the UE based on the fourth wireless signal;
determining that the second velocity of a second UE is greater than or equal to the threshold velocity; and
based on determining that the second velocity of the UE is greater than or equal to the threshold velocity, ending the split radio bearer and establishing a single radio bearer between the RAN and the UE by causing the first transceiver to transmit, to the UE, a fifth wireless signal with a third frequency that is greater than or equal to 400 MHz and less than 30 GHz.

4. A method, comprising:
receiving by a radio access network (RAN), from a user equipment (UE), a first wireless signal over a sub-extremely high frequency (EHF) resource;
determining, by the RAN, a velocity of the UE based on the first wireless signal, wherein the velocity comprises a speed of the UE in a radial direction away from the RAN;
determining, by the RAN, that the velocity of the UE is less than a threshold velocity; and
based on determining that the velocity of the UE is less than the threshold velocity, transmitting by the RAN, to the UE, a second wireless signal with over an EHF resource.

5. The method of claim 4, wherein determining the velocity of the UE based on the first wireless signal comprises:
determining a Doppler shift in the first wireless signal; and
determining the velocity of the UE based on the Doppler shift.

6. The method of claim 4, wherein the velocity of the UE is encoded in the first wireless signal and determining the velocity of the UE based on the first wireless signal comprises:
extracting the velocity from the first wireless signal.

7. The method of claim 4, wherein the RAN comprises an eNodeB and a gNodeB, the eNodeB receiving the first wireless signal, the gNodeB transmitting the second wireless signal.

8. The method of claim 4, the sub-EHF resource being a first sub-EHF resource, the method further comprising:
based on determining that the velocity of the UE is less than the threshold velocity, transmitting, to the UE, a third wireless signal over a second sub-EHF resource.

9. The method of claim 4, the EHF resource being a first EHF resource, the method further comprising:
based on determining that the velocity of the UE is less than the threshold velocity, receiving, from the UE, a third wireless signal over a second EHF resource.

10. The method of claim 4, the UE being a first UE, the sub-EHF resource being a first sub-EHF resource, the velocity being a first velocity, the method further comprising:
  receiving, from a second UE, a third wireless signal over a second sub-EHF resource;
  determining a second velocity of the second UE based on the third wireless signal;
  determining that the second velocity of the second UE is greater than or equal to the threshold velocity; and
  based on determining that the second velocity of the second UE is greater than or equal to the threshold velocity, transmitting, to the second UE, a fourth wireless signal over a third sub-EHF resource.

11. The method of claim 4, the velocity being a first velocity, the sub-EHF resource being a first sub-EHF resource, the method further comprising:
  receiving, from the UE, a third wireless signal;
  determining a second velocity of the UE based on the third wireless signal;
  determining that the second velocity of a second UE is greater than or equal to the threshold velocity; and
  based on determining that the second velocity of the UE is greater than or equal to the threshold velocity, transmitting, to the UE, a fourth wireless signal over a second sub-EHF resource.

12. A system, comprising:
  at least one transceiver;
  at least one processor; and
  memory storing instructions that, when executed by the at least one processor, cause the system to perform operations comprising:
    receiving, by the at least one transceiver from a user equipment (UE), a first wireless signal with a first frequency that is less than 30 Gigahertz (GHz);
    determining a velocity of the UE based on the first wireless signal;
    determining that the velocity of the UE is less than a threshold velocity; and
    based on determining that the velocity of the UE is less than the threshold velocity, transmitting, by the at least one transceiver to the UE, a second wireless signal with a second frequency that is greater than or equal to 30 GHz.

13. The system of claim 12, wherein determining the velocity of the UE based on the first wireless signal comprises:
  determining a Doppler shift in the first wireless signal; and
  determining the velocity of the UE based on the Doppler shift.

14. The system of claim 12, wherein the velocity of the UE is encoded in the first wireless signal and determining the velocity of the UE based on the first wireless signal comprises:
  extracting the velocity from the first wireless signal.

15. The system of claim 12, wherein the velocity comprises a speed of the UE in a radial direction away from the system.

16. The system of claim 12, wherein the operations further comprise:
  based on determining that the velocity of the UE is less than the threshold velocity, transmitting, by the at least one transceiver to the UE, a third wireless signal with a third frequency that is less than 30 GHz.

17. The system of claim 12, wherein the operations further comprise:
  Based on determining that the velocity of the UE is less than the threshold velocity, receiving, by the at least one transceiver from the UE, a third wireless signal with a third frequency that is greater than 30 GHz.

18. The system of claim 12, the UE being a first UE, the velocity being a first velocity, the operations further comprising:
  receiving, by the at least one transceiver from a second UE, a third wireless signal with a third frequency that is less than 30 GHz;
  determining a second velocity of the second UE based on the third wireless signal;
  determining that the second velocity of the second UE is greater than or equal to the threshold velocity; and
  based on determining that the second velocity of the second UE is greater than or equal to the threshold velocity, transmitting, by the at least one transceiver to the second UE, a fourth wireless signal with a fourth frequency that is less than 30 GHz.

19. The system of claim 12, the velocity being a first velocity, the operations further comprising:
  receiving, by the at least one transceiver from the UE, a third wireless signal;
  determining a second velocity of the UE based on the third wireless signal;
  determining that the second velocity of a second UE is greater than or equal to the threshold velocity; and
  based on determining that the second velocity of the UE is greater than or equal to the threshold velocity, transmitting, by the at least one transceiver to the UE, a fourth wireless signal with a third frequency that is less than 30 GHz.

* * * * *